(12) United States Patent
Tavernier

(10) Patent No.: US 11,378,156 B2
(45) Date of Patent: Jul. 5, 2022

(54) JOINING DEVICE WITH SPACER FOR LINKING THE TWO ENDS OF A CONVEYOR BELT

(71) Applicant: FP BUSINESS INVEST, Saint-Chamond (FR)

(72) Inventor: Bernard Tavernier, Saint-Chamond (FR)

(73) Assignee: FP BUSINESS INVEST, Saint-Chamond (FR)

( * ) Notice: Subject to any disclaimer, the term of this patent is extended or adjusted under 35 U.S.C. 154(b) by 0 days.

(21) Appl. No.: 16/975,027

(22) PCT Filed: Feb. 22, 2019

(86) PCT No.: PCT/FR2019/050408
§ 371 (c)(1),
(2) Date: Dec. 21, 2020

(87) PCT Pub. No.: WO2019/162630
PCT Pub. Date: Aug. 29, 2019

(65) Prior Publication Data
US 2021/0239182 A1    Aug. 5, 2021

(30) Foreign Application Priority Data
Feb. 22, 2018    (FR) ...................................... 18/51535

(51) Int. Cl.
*F16G 3/08*    (2006.01)
(52) U.S. Cl.
CPC ...................... *F16G 3/08* (2013.01)

(58) Field of Classification Search
CPC ........................................................ F16G 3/08
(Continued)

(56) References Cited

U.S. PATENT DOCUMENTS

| 2,446,311 A | 8/1948 | Traxler |
| 3,748,698 A | 7/1973 | Lachmann |

(Continued)

FOREIGN PATENT DOCUMENTS

| EP | 0827575 B1 | 3/2000 |
| EP | 1163459 A1 | 12/2001 |

(Continued)

OTHER PUBLICATIONS

International Search Report issued for corresponding International Patent Application No. PCT/FR2019/050408 dated Jun. 14, 2019, along with an English translation, citing above references.

(Continued)

*Primary Examiner* — William R Harp
(74) *Attorney, Agent, or Firm* — Hauptman Ham, LLP

(57) ABSTRACT

A junction device for connecting two ends of at least one longitudinal conveyor belt includes at least a first junction plate and a second junction plate which are configured to each cover a distinct side of the ends of the conveyor belt, a fastening device for fastening said junction plates together, and a removable spacer which is suited to be interposed between the wings of the first pair of wings formed by the junction plates, such that the centring hole of the spacer is offset from the junction plane, to free the space delimited between the second pair of wings.

10 Claims, 6 Drawing Sheets

(58) Field of Classification Search
USPC ........................................ 198/844.2; 474/257
See application file for complete search history.

(56) References Cited

U.S. PATENT DOCUMENTS

| | | | |
|---|---|---|---|
| 5,839,571 | A | 11/1998 | Jakob |
| 6,601,698 | B2 | 8/2003 | Jakob |
| 2018/0274628 | A1* | 9/2018 | Pieterse .................... F16G 3/08 |

FOREIGN PATENT DOCUMENTS

| | | |
|---|---|---|
| WO | 97/26466 A1 | 7/1997 |
| WO | 01/53715 A1 | 7/2001 |

OTHER PUBLICATIONS

Written Opinion issued for corresponding International Patent Application No. PCT/FR2019/050408 dated Jun. 14, 2019.

* cited by examiner

JOINING DEVICE WITH SPACER FOR LINKING THE TWO ENDS OF A CONVEYOR BELT

CROSS REFERENCE TO RELATED APPLICATION

This present application is a national stage filing under 35 U.S.C § 371 of PCT application number PCT/FR2019/050408 filed on Feb. 22, 2019 which is based upon and claims the benefit of priorities to French Patent Application No. 18/51535 filed on Feb. 22, 2018 in the French Patent Office, which are incorporated herein in their entireties by reference.

FIELD

The invention relates to a junction device for connecting the two ends of a longitudinal conveyor belt.

With the aim of simplification, the term conveyor belt will have, by convention, in the present description not just the sense of conveyor belt but also that of drive belt.

BACKGROUND

Conveyor belts, also called band conveyors, used to transport different materials or different products, such as coal, ore, industrial or farming products are known.

These conveyor belts consist of belts made of a reinforced elastomer, or made of a reinforced synthetic material, of an appropriate length and width, of which the ends must be connected together, before mounting, or after mounting, on support and drive devices comprising return rollers and idler rollers. Often these devices also comprise tensioning members, having the aim of correctly tensioning the conveyor belt.

A junction device is known which comprises clips of general U shape, cut from a metal sheet, which clips comprise upper plates and lower plates connected by knuckles.

The clips are fastened in two series straddling each of the ends of the conveyor belt to connect, in such a way that the knuckles jut out and that those of one series can be interleaved between the knuckles of the other series.

A linking and hinging rod is passed inside the interleaved knuckles in such a way as to connect thereby the two ends while forming a sort of hinge.

The fastening devices for fastening the clips onto the ends of the conveyor belt consist of stemmed fastenings such as crampons, rivets and screws.

Junction devices are also known resorting to junction plates generally made of reinforced elastomer or made of reinforced synthetic material, arranged respectively on one side and on the other side of the ends of the conveyor belt and fastened on the ends that it involves connecting. Examples of such junction plate devices are given in the patents EP-0827575-B1 and EP-1163459-B1.

These devices comprise an upper plate and a lower plate which delimit a spacing suited to engage therein the respective end of a conveyor belt.

Junction devices are known which are produced by moulding or by injection and have an "H" shaped structure of which the lower and upper plates are connected by a central part, the plates being formed of a single piece.

This type of "H" structure requires for its manufacture as many moulds as thicknesses of conveyor belts encountered in the field, and has to be manufactured, hence, in very small series, which increases the cost price, manufacturing price, storage price and distribution price.

This problem, namely that of the multiplicity of moulds and moulded products having to cope with the varied thicknesses of conveyor belts, has been resolved notably by producing junction devices in three distinct parts: a first plate constituting upper left and right wings forming a single piece, a second plate constituting lower left and right wings forming a single piece, and an intermediate part, corresponding to the median bar of the "H" shaped profile, this intermediate part forming spacer.

In such a configuration, it becomes possible to manufacture the two lower and upper plates in isolation and each is configured so as to be suited to the forces that they undergo (compressive/tractive forces) and the associated stresses.

The fastening of the lower and upper plates on the ends of the conveyor belt generally takes place by means of fastening devices of the type rivets, spikes, crampons, or screws-nuts.

The document EP-1163459-B1 describes a junction device in three distinct parts of the type described above, which comprises a first junction plate and a second junction plate which are configured to each cover a distinct side of the ends of the conveyor belt such that the conveyor belt is interposed vertically between the two junction plates.

The two junction plates form a first pair of wings which is suited to pinch a first end of the conveyor belt and a second pair of wings which is suited to pinch a second end of the conveyor belt, the first pair of wings and the second pair of wings being laid out on either side of a junction plane.

In addition, the junction device comprises devices for fastening the plates together, and a removable spacer which is interposed vertically between the first junction plate and the second junction plate to move the plates apart.

Still according to the document EP-1163459-B1, the spacer is fastened by one of the fastening devices, at the centre of the assembly formed by the two junction plates, along a longitudinal direction.

The fastening of the conveyor belt by the junction device is for example achieved in the manner chronologically described hereafter.

The two wings of the second pair of wings formed by the junction plates are spaced apart by elastic deformations of the junction plates while the second end of the conveyor belt is inserted between the two wings of the second pair of wings.

The second end of the conveyor belt is fastened onto the two wings of the second pair of wings formed by the junction plates by fastening devices.

The spacer is removed from between the wings of the first pair of wings formed by the junction plates.

Finally, the first end of the conveyor belt is inserted between the two wings of the first pair of wings formed by the junction plates, before being fastened onto the two wings of the first pair of wings.

It is understood that the second end of the conveyor belt must be inserted the furthest possible longitudinally towards the centre of the junction device, that is to say the closest to the spacer which is laid out at the centre of the junction device.

This insertion step requires simultaneously an important force of moving apart the two wings of the second pair of wings which are retained together by the fastening device which fastens the spacer, which makes the operation difficult.

SUMMARY

The present invention notably aims to resolve this drawback and for this purpose relates to a junction device for connecting two ends of at least one longitudinal conveyor belt, the junction device comprising at least:

a first junction plate and a second junction plate which are configured to each cover a distinct side of the ends of the conveyor belt such that said conveyor belt is interposed vertically between the two junction plates, said junction plates forming a first pair of wings which is suited to pinch a first end of the conveyor belt and a second pair of wings which is suited to pinch a second end of the conveyor belt, the first pair of wings and the second pair of wings being laid out on either side of a junction plane, a device for fastening said junction plates together, a removable spacer which is configured to be interposed vertically between the first junction plate and the second junction plate, in an assembled position of the spacer, to move said plates apart, and which delimits a centring hole laid out to be traversed by a linking element which fastens the spacer onto the junction plates, characterised in that the spacer is suited to be interposed between the wings of the first pair of wings, such that the centring hole of the spacer is offset from the junction plane, to free the space delimited between the second pair of wings.

The decentered position of the spacer, beyond the second pair of wings, favours the insertion of the second end of the conveyor belt between the second pair of wings.

Indeed, such a position of the spacer favours the spacing of the wings of the second pair of wings, by elastic deformation.

According to another characteristic, the junction plane extends transversally to the centre of the assembly formed by the first junction plate and the second junction plate.

Such a characteristic makes it possible in particular to improve the strength of the junction of the conveyor belt by the junction device.

According to another characteristic, the spacer is suited to be laid out entirely between the wings of the first pair of wings.

This characteristic allows the spacer to completely free the space delimited between the second pair of wings.

According to another characteristic, the fastening device comprises at least a first fastening element which is mounted on the first junction plate, a second associated fastening element which is mounted on the second junction plate, a linking element which connects the first fastening element on the second fastening element, and the first fastening element comprising a centring portion which projects vertically from the first junction plate and which is configured to cooperate with the centring hole of the spacer to position the spacer.

Thus, the fastening device can fulfil a double function of centring of the spacer and fastening of the two junction plates.

According to another characteristic, the spacer has a stop face which is laid out facing the second pair of wings, and which extends at least in part along the junction plane, to form an end stop of the conveyor belt along the junction plane, when the spacer is in assembled position.

This characteristic enables the insertion of the second end of the conveyor belt up to the centre of the assembly formed by the first junction plate and the second junction plate.

According to another characteristic, the stop face of the spacer has the shape of an angular portion of a cylinder which extends around the centring hole of the spacer and which is globally tangential to the junction plane.

This characteristic allows the angular portion to remain tangential to the junction plane even in the event of slight pivoting.

According to another characteristic, the junction device comprises at least one second fastening device which is adjacent to the first fastening device, and the spacer delimits at least one first bearing face which is laid out facing at least one part of the second fastening device, to pivotally block the spacer around the centring hole of the spacer, when the spacer is in assembled position.

According to another characteristic, the linking element comprises a head which is suited to cooperate with said second fastening element, and an anchoring section which is suited to cooperate with said first fastening element of the associated fastening device.

According to another characteristic, the first junction plate and the second junction plate are identical and complementary.

The invention also relates to a spacer for a junction device of two ends of a longitudinal conveyor belt, the junction device being of the type comprising at least:

a first junction plate and a second junction plate which are configured to each cover a distinct side of the ends of the conveyor belt such that said conveyor belt is interposed vertically between the two junction plates, said junction plates forming a first pair of wings which is suited to pinch a first end of the conveyor belt and a second pair of wings which is suited to pinch a second end of the conveyor belt, the first pair of wings and the second pair of wings being laid out on either side of a junction plane, a first fastening device comprising a centring portion which projects vertically, and a second fastening device which is adjacent to the first fastening device, the spacer being suited to be interposed vertically between the first junction plate and the second junction plate to move said plates apart, and the spacer delimiting at least:

a centring hole which is suited to cooperate with said centring portion to position the spacer, a first bearing face which extends globally in an axial plane along the axis of the centring hole and which is suited to bear on at least one part of the second fastening device, to pivotally block the spacer around the centring hole of the spacer, and a stop face which is suited to form an end stop of the conveyor belt along the junction plane.

According to another characteristic, the stop face has the shape of an angular portion of a cylinder which extends along the axis of the centring hole of the spacer.

The invention finally relates to a method for the implementation of an assembly comprising a junction device and a conveyor belt which has a first end and a second end, characterised in that the method comprises at least:

a step of inserting the second end of the conveyor belt between the two wings of the second pair of wings formed by the junction plates, in a junction position wherein the second end of the conveyor belt bears on the spacer, a step of fastening the second end of the conveyor belt onto the two wings of the second pair of wings, a step of removing the spacer which consists in removing the spacer from between the wings of the first pair of wings formed by the junction plates, a step of inserting the first end of the conveyor belt between the two wings of the first pair of wings formed by the junction plates, in a junction position, and a step of fastening the first end of the conveyor belt onto the two wings of the first pair of wings.

BRIEF DESCRIPTION OF THE DRAWINGS

Other characteristics and advantages of the invention will become clear on reading the detailed description that follows, for the understanding of which reference will be made to the appended drawings in which.

DESCRIPTION

In the description and the claims, to clarify the description and the claims, the terminology longitudinal, vertical and transversal will be adopted in a non-limiting manner with reference to the trihedron L, V, T indicated in the figures.

In all of these figures, identical or analogous references represent identical or analogous members or sets of members.

In addition, the terms "upper", "lower", "vertical" and derivatives thereof refer to the position or to the orientation of an element or a component, this position or this orientation being considered when the junction plates are in configuration of service and extend in a horizontal plane.

Figure 1:
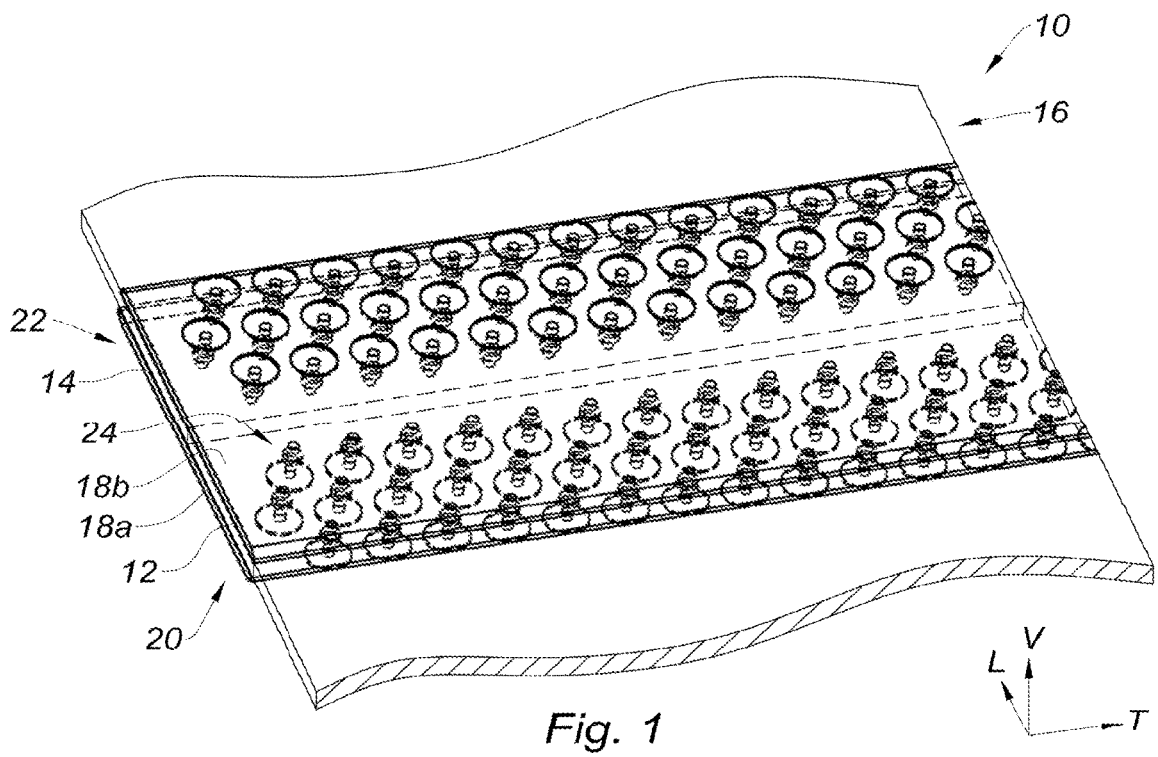
FIG. 1 is an overall perspective view which illustrates a junction device according to the invention which connects the two ends of a conveyor belt.

In FIG. 1 is represented a junction device 10 for connecting a first end 12 and a second end 14 of a conveyor belt 16 which extends longitudinally.

Figure 2:
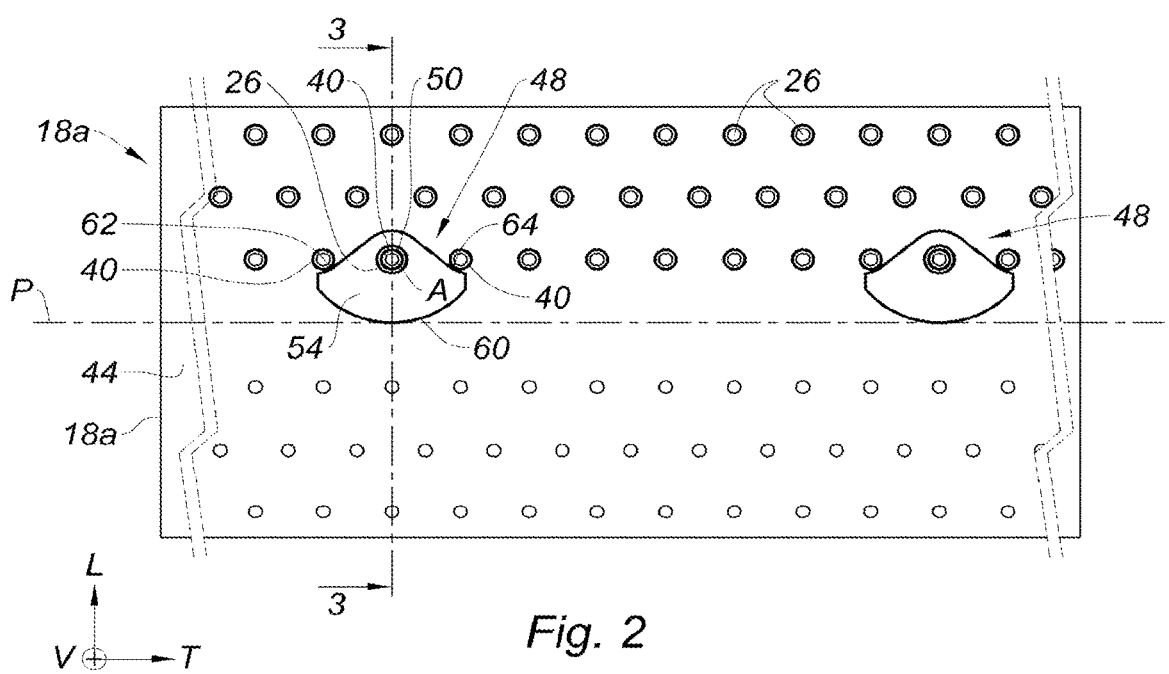
FIG. 2 is a truncated top view which illustrates the first junction plate and two spacers of the junction device according to the invention in assembled position.

The junction device 10 comprises a first lower junction plate 18*a* visible in FIG. 2, and a second upper junction plate 18*b*.

These junction plates 18*a*, 18*b* are made of a flexible and elastic material, for example made of vulcanised rubber, or a synthetic material such as polyurethane and they generally comprise an incorporated reinforcement, generally of textile type.

The junction plates 18*a*, 18*b* are configured to each cover a distinct side of the ends of the conveyor belt 16 such that the conveyor belt 16 is interposed vertically between the two junction plates 18*a*, 18*b*, as may be seen in FIG. 1.

The junction plates 18*a*, 18*b* form a first pair of wings 20 which pinches the first end 12 of the conveyor belt 16 and a second pair of wings 22 which pinches the second end 14 of the conveyor belt 16.

Figure 3:
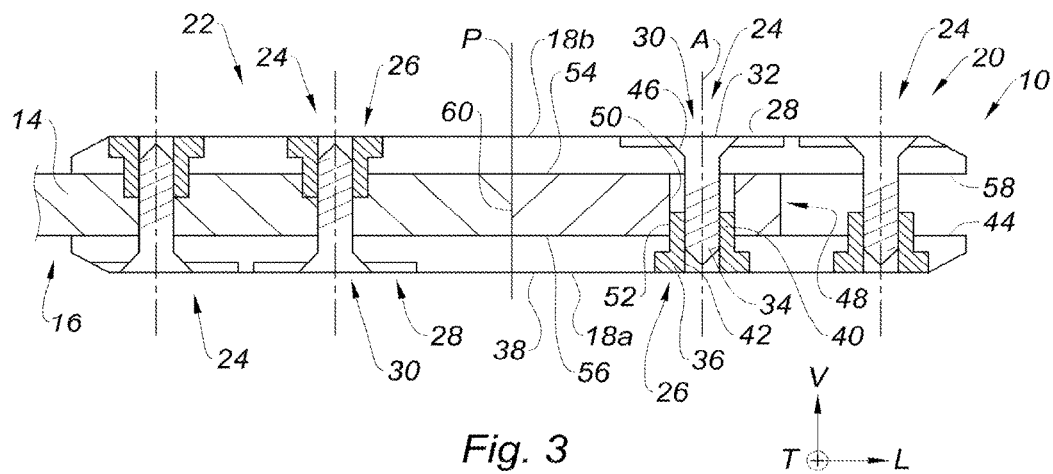
FIG. 3 is a transversal sectional view along line 3-3 of FIG. 2, which illustrates the first junction plate and the second junction plate and the spacer interposed between the two plates.
Figure 4:
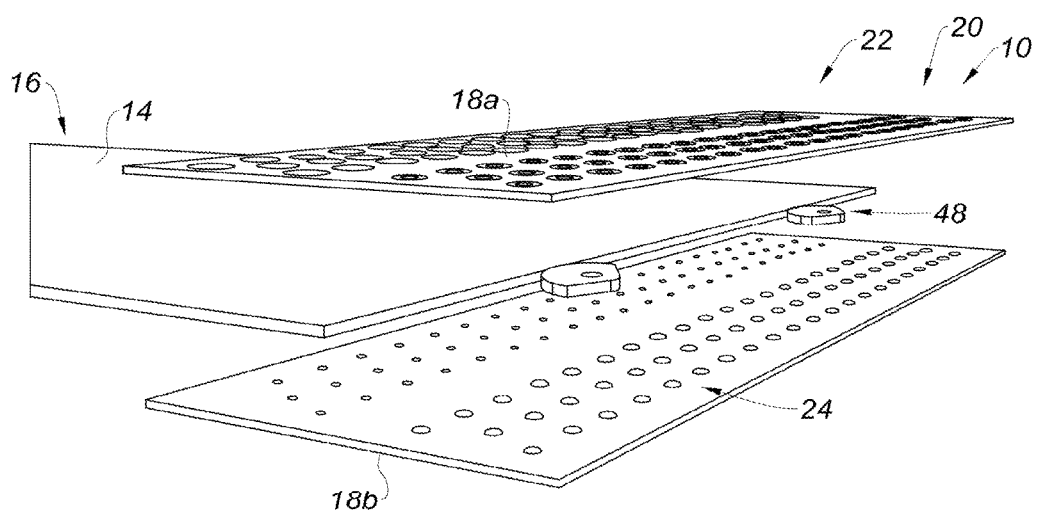
FIG. 4 is a perspective exploded view which illustrates the first junction plate and the second junction plate and the spacer interposed between the two plates.
Figure 5:
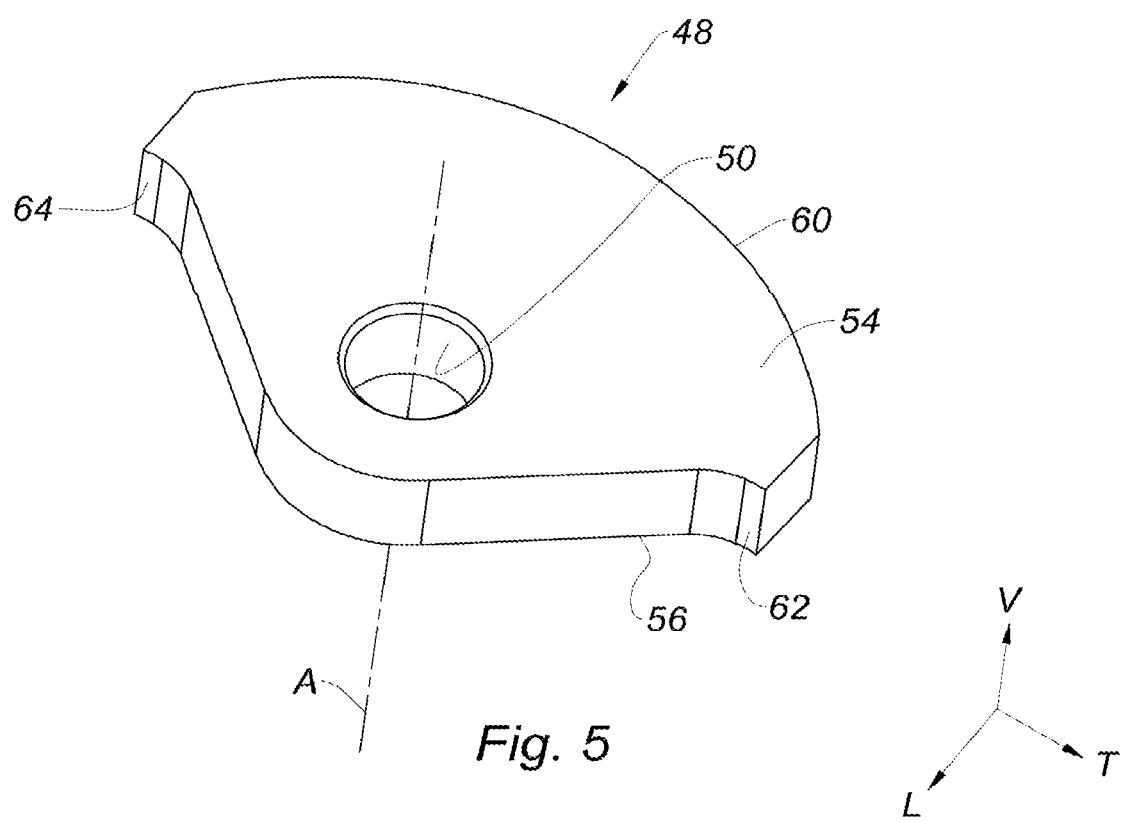
FIG. 5 is a perspective detailed view which illustrates the spacer of FIG. 2.

As may be seen in FIGS. 3 and 4, the first pair of wings 20 and the second pair of wings 22 are laid out on either side of a junction plane P which extends perpendicularly to the junction plates 18*a*, 18*b*, that is to say in a vertical and transversal plane according to the example described here.

The junction plane P extends transversally to the centre of the assembly formed by the first junction plate 18*a* and the second junction plate 18*b*.

In this way, once assembled with the ends 12, 14 of the conveyor belt 16, the longitudinal distance of the first end 12 covered by the first pair of wings 20 is equivalent to the longitudinal distance of the second end 14 covered by the second pair of wings 22 of the junction plates 18*a*, 18*b*.

Such a characteristic makes it possible to improve the strength of the junction device.

In addition, the junction device 10 comprises a first series of fastening devices 24 which are provided to fasten the first pair of wings 20 onto the first end 12 of the conveyor belt 16 and a second series of fastening devices 24 which are provided to fasten the second pair of wings 22 onto the second end 14 of the conveyor belt 16.

The first series and the second series of fastening devices 24 each comprise three rows of fastening devices 24, each row comprising a plurality of fastening devices 24 which are aligned transversally and regularly spaced apart. Obviously, this number of rows may vary.

The fastening devices 24 of the first series each comprise a first fastening element 26, a second fastening element 28 and a vertical linking element 30 which connects the first fastening element 26 onto the second fastening element 28, through the conveyor belt 16.

The linking element 30 is constituted of a screw which extends vertically from a head 32 up to a body forming tapped anchoring section 34.

The first fastening element 26 has the shape of a socket which is at least in part embedded in the first junction plate 18*a*.

The first fastening element 26 comprises an annular flange 36 which bears axially on a lower face 38 of the first lower junction plate 18*a*.

In addition, the first fastening element 26 comprises a tubular part 40 which delimits a vertical tapped hole 42 and which projects vertically from the upper face 44 of the first junction plate 18*a*, between the two junction plates 18*a*, 18*b*. This vertical projection is also covered with vulcanised material forming the junction plate such that each tubular part 40 which projects vertically from the lower face of a junction plate is covered with vulcanised rubber and thus embedded in the associated junction plate.

The tapped hole 42 cooperates with the anchoring section 34 of the linking element 30.

The second fastening element 28 has the shape of a washer which is embedded in the second upper junction plate 18*b* and which delimits a through hole for the linking element 30 and a seat 46 which houses the head 32 of the linking element 30.

Thus, the fastening devices 24 of the first series make it possible to clamp the first pair of wings 20 onto the first end 12 of the conveyor belt 16.

Similarly, the fastening devices 24 of the second series are identical to the fastening devices 24 described above, but are reversed in their layout.

Indeed, with reference to FIG. 3, the first fastening element 26 of each fastening device 24 of the second series is mounted on the second upper junction plate 18*b* and the second fastening element 28 is mounted on the first lower junction plate 18*a*.

The first junction plate 18*a* and the second junction plate 18*b* are identical, and they are angularly offset by a half-turn around a vertical axis.

The fact of this inversion of the fastening devices 24 is particularly advantageous given that this greatly simplifies the installation of the junction plate by an operator since by fastening the junction plate to one end of the conveyor belt the fastening devices 24, in particular the linking elements 30, have a similar orientation for a same end of the conveyor belt and the operator is not obliged to change orientation to put in place these linking elements on this same end. Indeed, the vertical alignment of the first and second fastening elements 26, 28 determines the orientation of the linking means 30, notably the screw which extends vertically from the head 32 up to the body forming tapped anchoring section 34.

It will further be noted that the first and second series of fastening devices 24 are spaced together longitudinally by a median zone substantially in line with the junction plane P which is free of fastening devices 24, that is to say that in this zone the junction device 10 does not comprise fastening devices 24. This improves the elasticity of the junction device 10 at this spot and improves its mechanical strength. Indeed, a row of fastening devices 24 at the centre of the junction device 10 could favour to a lesser extent an incipient breakage.

In accordance with the invention, the junction device 10 comprises two removable spacers 48 which are each interposed vertically between the first junction plate 18a and the second junction plate 18b to move the plates apart. As may be seen in FIG. 3, each spacer 48 is configured to be interposed between the wings of the first pair of wings 20 and is offset from the junction plane P, to free the space delimited between the second pair of wings 22.

The expression "offset from the junction plane P" is taken to mean that the junction plane P is not secant to the spacers 48.

In other words, each spacer 48 is offset longitudinally with respect to the centre of the assembly formed by the two junction plates 18a, 18b, and each spacer 48 is freed from the space which is delimited between the second pair of wings 22.

For this purpose, with reference to FIG. 3, each spacer 48 delimits a centring hole 50 which extends along a vertical axis A and which is suited to cooperate with the tubular part 40 projecting from a first fastening element 26 forming centring portion 52, to position the spacer 48.

Also, each spacer 48 is delimited vertically by an upper face 54 and a lower face 56 which bear vertically on the lower face 58 of the second junction plate 18b and on the upper face 44 of the first junction plate 18a respectively.

According to FIGS. 2 to 5, each spacer 48 has a stop face 60 which is laid out facing the second pair of wings 22, and which extends in part along the junction plane P, to form an end stop of the second end 14 of the conveyor belt 16 along the junction plane P, when the spacer is in assembled position, that is to say a stop against which the second end 14 of the conveyor belt 16 comes in contact and in abutment along this junction plane P.

More specifically, the stop face 60 of each spacer 48 has the shape of an angular portion of a cylinder which extends around the axis A of the centring hole 50 of the associated spacer 48 and which is globally tangential to the junction plane P, as may be seen in FIG. 2.

In addition, each spacer 48 delimits a first bearing face 62 and a second bearing face 64 which each extend axially along the axis A of the associated centring hole 50.

With reference to FIG. 2, the first bearing face 62 and the second bearing face 64 are each laid out facing at least one part of a first fastening device 24 and a second fastening device 24 respectively which are transversally opposite and which are transversally adjacent to the fastening devices 24 which bear the spacer 48, to pivotally block the spacer 48 around the centring hole 50 of the spacer 48, when the spacer is in assembled position.

The first bearing face 62 and the second bearing face 64 of each spacer 48 bear against the projecting tubular part 40 of the first associated fastening elements 26, which is here covered with vulcanised material.

In addition to pivotally blocking each spacer 48, the bearing faces 62, 64 make it possible to spread out the longitudinal thrust forces applied on the associated spacer 48 by the end of the conveyor belt 16.

In a non-limiting manner, each bearing face 62, 64 of the spacer can delimit a clearance (not represented) which favours the putting in place of each spacer 48 and which is filled by elastic deformation when the end of the conveyor belt bears longitudinally against the spacers 48.

It will be noted that in a complementary or alternative manner, the spacer 48 may have a bearing face, also extending in an axial plane along the axis of the centring hole 50, and which is suited to bear on at least one part of an adjacent fastening device to pivotally block the spacer 48 around the centring hole 50 of the spacer 48, the fastening device which is adjacent to the first fastening device being situated on another row of fastening devices and not necessarily transversally.

The invention also relates to a method for the implementation of the junction device 10 according to the invention described previously.

Figure 6:
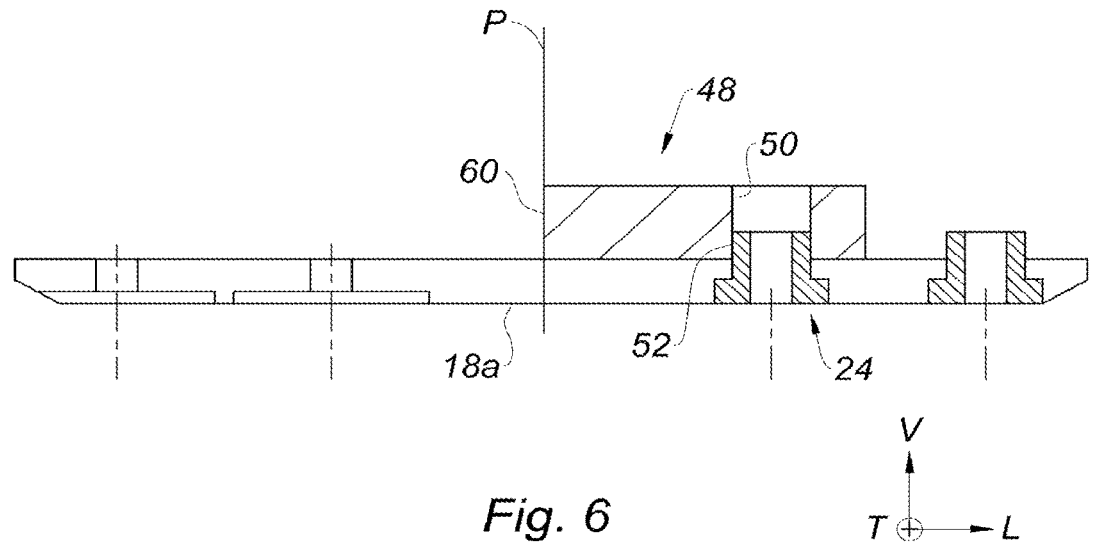
FIGS. 6 to 11 illustrate the steps of the method for the implementation of the junction device according to the invention.

The method comprises a prior step of putting in place each spacer 48, illustrated in FIG. 6, which consists in making the centring hole 50 of each spacer 48 cooperate with the centring portion 52 of the fastening device 24 associated with each spacer 48, such that the stop face 60 of each spacer is tangential to the transversal junction plane P.

Figure 7:
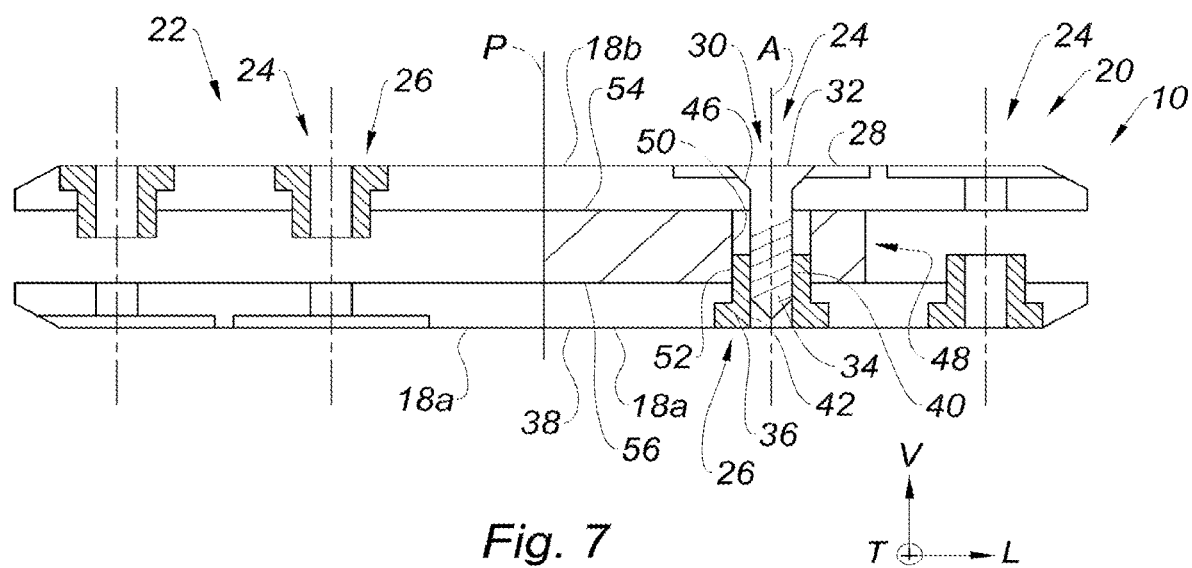

After having put in place the spacers 48 on the first junction plate 18a, the second junction plate 18b is matched with the first junction plate 18a, as may be seen in FIG. 7, then the linking element 30 of the two fastening devices 24 which are associated with a spacer 48 is screwed onto the associated first fastening element 26 to pinch the wings of the first pair of wings 20 on the spacers 48.

Figure 8:
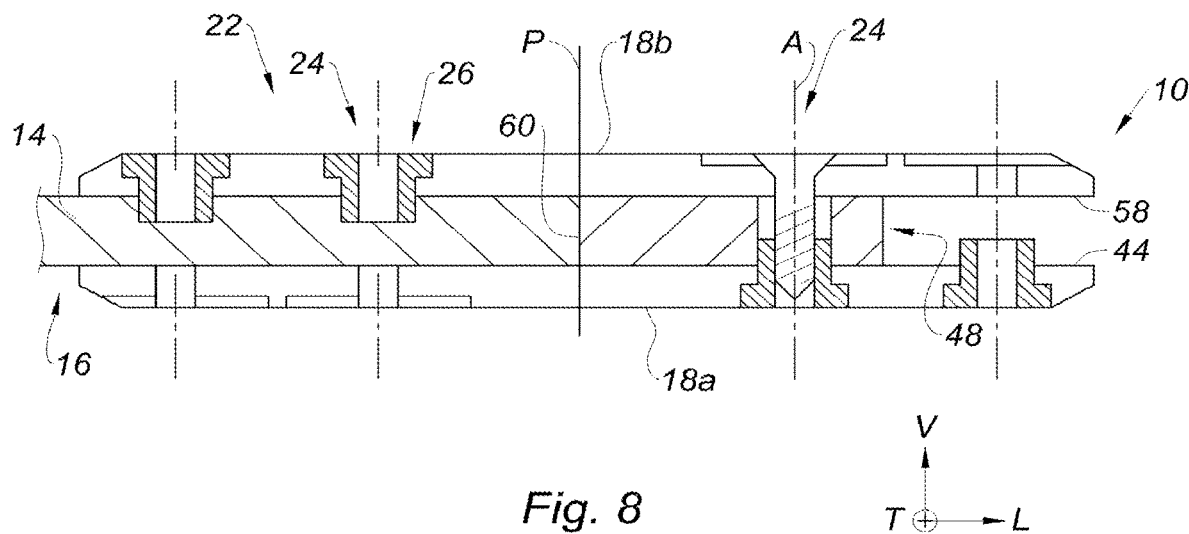

Also, the method comprises a step of inserting the second end 14 of the conveyor belt 16 between the two wings of the second pair of wings 22 formed by the junction plates 18a, 18b, illustrated in FIG. 8, in a junction position wherein the second end 14 of the conveyor belt 16 bears longitudinally on each spacer 48.

The insertion of the second end 14 of the conveyor belt 16 is carried out by moving away the wings of the second pair of wings 22 which deform elastically.

It is noted that the offset position, with respect to the junction plane P, of the centring hole 50 of each spacer 48 and linking elements 30 which fasten the spacers 48, favours the spacing of the wings of the second pair of wings 22 and thus favours the insertion of the second end 14 of the conveyor belt 16 up to the junction plane P, that is to say substantially up to the centre of the assembly formed by the two junction plates 18a, 18b.

Figure 9:
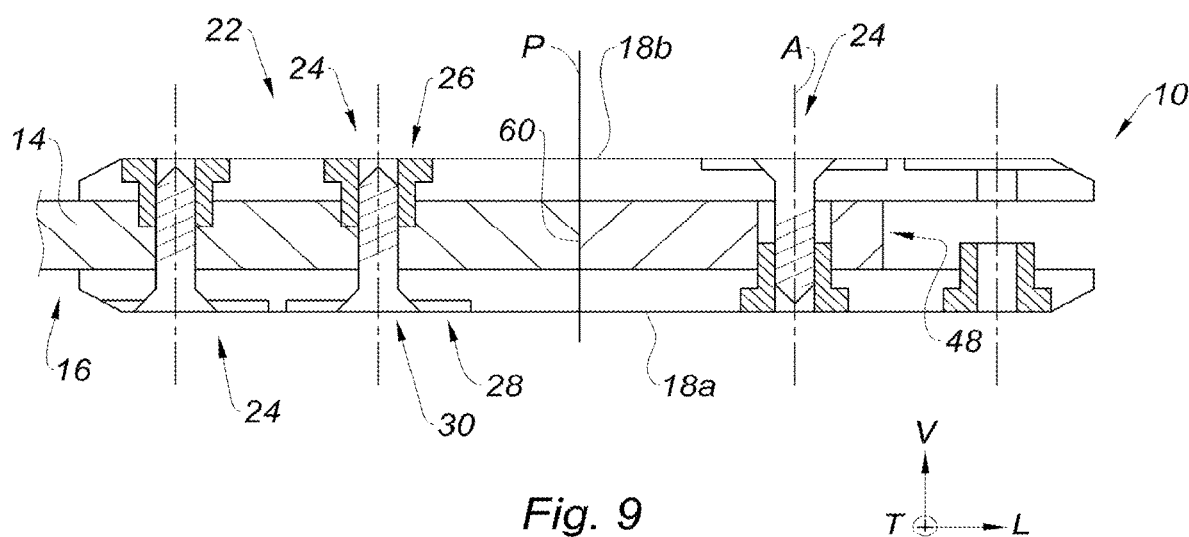

The step of inserting the second end 14 of the conveyor belt 16 is followed by a step of fastening the second end 14 of the conveyor belt 16 onto the two wings of the second pair of wings 22, by means of the second series of fastening device 24, as may be seen in FIG. 9.

Figure 10:
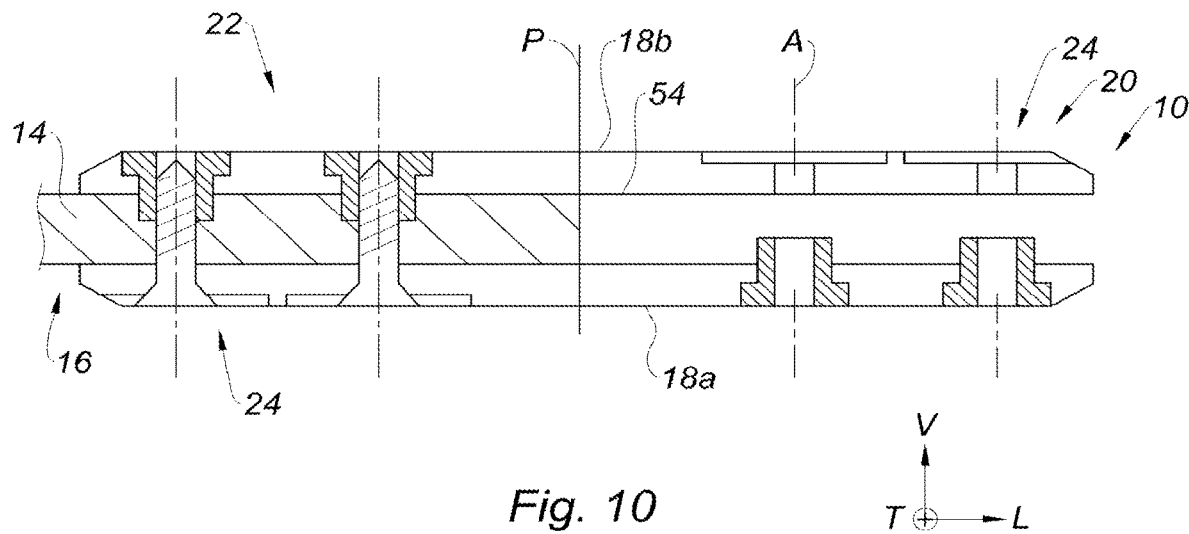

After having fastened all or part of the second end 14 of the conveyor belt 16, the method comprises a step of removing the spacer 48, illustrated in FIG. 10, which consists in unscrewing the linking elements 30 which retain the two spacers 48 and in removing the spacers from between the wings of the first pair 20 of wings formed by the junction plates 18*a*, 18*b*.

The removal step is followed by a step of inserting the first end 12 of the conveyor belt 16 between the two wings of the first pair of wings 20 formed by the junction plates 18*a*, 18*b*, in a junction position wherein the first end 12 of the conveyor belt 16 can reach the junction plane P.

Figure 11:
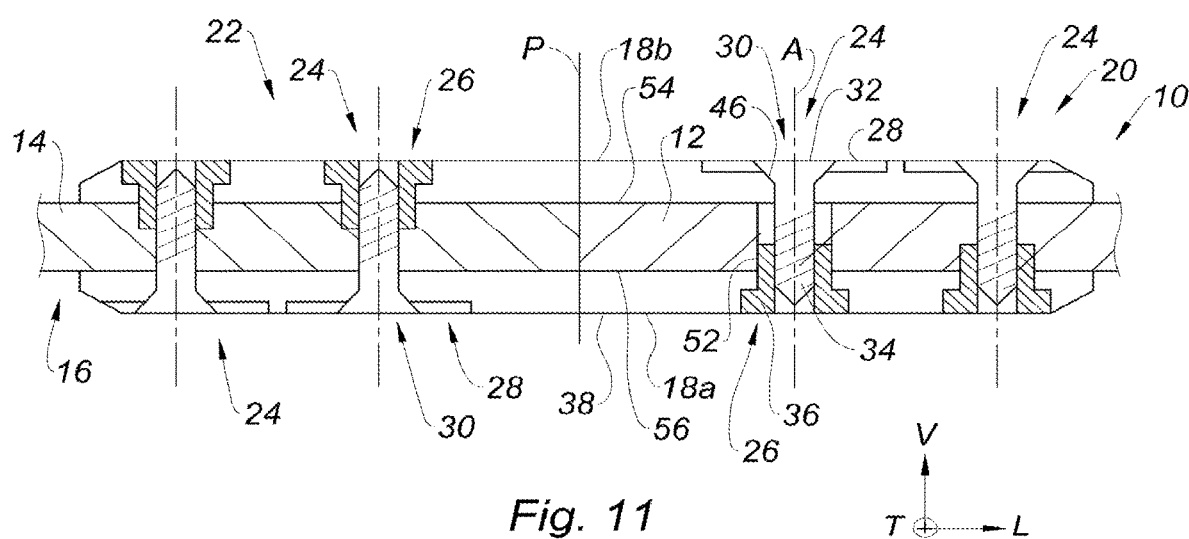

Finally, with reference to FIG. 11, the method comprises a step of fastening the first end 12 of the conveyor belt 16 onto the two wings of the first pair of wings 20.

The invention is described above as an example. It is understood that those skilled in the art are able to carry out different alternative embodiments of the invention without however going beyond the scope of the invention.

The invention claimed is:

1. A junction device for connecting two ends of at least one longitudinal conveyor belt, the junction device comprising at least:
    a first junction plate and a second junction plate configured to each cover a distinct side of the ends of the conveyor belt such that said conveyor belt is interposed vertically between the two junction plates, said junction plates forming a first pair of wings configured to pinch a first end of the conveyor belt and a second pair of wings configured to pinch a second end of the conveyor belt, the first pair of wings and the second pair of wings being on either side of a junction plane, the junction plane extending transversally to the centre of the assembly formed by the first junction plate and the second junction plate,
    a fastening device for fastening said junction plates together, and
    a removable spacer configured to be interposed vertically between the first junction plate and the second junction plate to move apart said plates, and which delimits a centring hole configured to be traversed by a linking element which fastens the spacer onto the junction plates,
    wherein the spacer is further configured to be interposed between the wings of the first pair of wings, such that the centring hole of the spacer is offset from the junction plane, to free a space delimited between the second pair of wings, and the spacer has a stop face configured to face the second pair of wings, and which is configured to extend at least in part along the junction plane, to form an end stop of the conveyor belt along the junction plane, when the spacer is in an assembled position.

2. The junction device according to claim 1, wherein the spacer is configured to be positioned entirely between the wings of the first pair of wings.

3. The junction device according to claim 1, wherein the fastening device comprises at least a first fastening element configured to be mounted on the first junction plate, a second fastening element configured to be mounted on the second junction plate, the linking element which is configured to connect the first fastening element and the second fastening element, and the first fastening element comprises a centring portion which is configured to project vertically from the first junction plate and configured to cooperate with the centring hole of the spacer to position the spacer.

4. The junction device according to claim 3, wherein the linking element configured to connect the first fastening element and the second fastening element comprises a head configured to cooperate with said second fastening element, and an anchoring section configured to cooperate with said first fastening element.

5. The junction device according to claim 1, wherein the stop face of the spacer comprises an angular portion of a cylinder which extends around the centring hole of the spacer and configured to be globally tangential to the junction plane, when the spacer is in an assembled position.

6. The junction device according to claim 1, wherein the fastening device is a first fastening device, and the junction device further comprises:
    at least one second fastening device configured to be adjacent to the first fastening device,
    wherein the spacer is configured to delimit at least one first bearing face facing at least one part of the second fastening device to pivotally block the spacer around the centring hole of the spacer when the spacer is in the assembled position.

7. The junction device according to claim 1, wherein the first junction plate and the second junction plate are identical and complementary.

8. A spacer for a junction device of two ends of a longitudinal conveyor belt, the junction device comprising:
    a first junction plate and a second junction plate configured to each cover a distinct side of the ends of the conveyor belt such that said conveyor belt is interposed vertically between the two junction plates, said junction plates forming a first pair of wings configured to pinch a first end of the conveyor belt and a second pair of wings configured to pinch a second end of the conveyor belt, the first pair of wings and the second pair of wings being on either side of a junction plane, and
    a first fastening device comprising a centring portion which projects vertically, and a second fastening device which is adjacent to the first fastening device,
    wherein the spacer is configured to be interposed vertically between the first junction plate and the second junction plate to move said plates apart, and the spacer is configured to delimit at least:
    a centring hole configured to cooperate with said centring portion to position the spacer,
    a first bearing face which extends globally in an axial plane along an axis of the centring hole and which is suited configured to bear on at least one part of the second fastening device, to pivotally block the spacer around the centring hole of the spacer, and
    a stop face configured to form an end stop of the conveyor belt along the junction plane.

9. The spacer according to claim 8, wherein the stop face comprises an angular portion of a cylinder which extends along the axis of the centring hole of the spacer.

10. A method for implementing an assembly comprising the junction device according to claim 1 and a conveyor belt having said first end and said second end, the method comprising:
    a step of inserting the second end of the conveyor belt between the two wings of the second pair of wings formed by the junction plates, in a first junction position wherein the second end of the conveyor belt bears on the spacer,
    a step of fastening the second end of the conveyor belt onto the two wings of the second pair of wings,
    a step of removing the spacer from between the wings of the first pair of wings formed by the junction plates, a step of inserting the first end of the conveyor belt between the two wings of the first pair of wings formed by the junction plates, in a second junction position, and a step of fastening the first end of the conveyor belt onto the two wings of the first pair of wings.

\* \* \* \* \*